(12) United States Patent
Whalen

(10) Patent No.: US 11,878,919 B1
(45) Date of Patent: Jan. 23, 2024

(54) SYSTEM AND METHOD OF DISTILLING/DESALINATING WATER IN A VACUUM-APPLIED MULTI-PHASE MANNER

(71) Applicant: Daniel Anthony Whalen, Arlington, NY (US)

(72) Inventor: Daniel Anthony Whalen, Arlington, NY (US)

( * ) Notice: Subject to any disclaimer, the term of this patent is extended or adjusted under 35 U.S.C. 154(b) by 0 days.

(21) Appl. No.: 17/967,625

(22) Filed: Oct. 17, 2022

(51) Int. Cl.
| | | |
|---|---|---|
| *C02F 1/06* | (2023.01) | |
| *C02F 1/22* | (2023.01) | |
| *C02F 1/00* | (2023.01) | |
| C02F 103/08 | (2006.01) | |

(52) U.S. Cl.
CPC ............ *C02F 1/06* (2013.01); *C02F 1/008* (2013.01); *C02F 1/22* (2013.01); *C02F 2103/08* (2013.01); *C02F 2209/006* (2013.01); *C02F 2301/063* (2013.01)

(58) Field of Classification Search
CPC .... C02F 1/008; C02F 1/06; C02F 1/22; C02F 2103/08; C02F 2209/006; C02F 2301/063
See application file for complete search history.

(56) References Cited

U.S. PATENT DOCUMENTS

| | | |
|---|---|---|
| 3,690,116 A | 9/1972 | Cheng |
| 3,714,791 A | 2/1973 | Peck |
| 4,236,382 A | 12/1980 | Cheng |
| 4,420,318 A | 12/1983 | Cheng |
| 4,505,728 A | 3/1985 | Cheng |

OTHER PUBLICATIONS

Schaschke, Carl. (2014). Dictionary of Chemical Engineering. Oxford University Press. Retrieved from https://app.knovel.com/hotlink/toc/id:kpDCE00021/dictionary-chemical-engineering/dictionary-chemical-engineering (Year: 2014).*

* cited by examiner

*Primary Examiner* — Brian A McCaig

(57) ABSTRACT

A system and method of distilling/desalinating water in a vacuum-applied multi-phase manner purifies water of its dissolved and/or undissolved contaminants. The system includes at least one primary vessel, at least one vacuum apparatus, and at least one secondary vessel. The primary vessel initially retains a quantity of source water. A vacuum pressure is then generated inside the primary vessel with the vacuum apparatus, which evaporates a first water portion off the source water and freezes a second water portion on the source water. The first water portion is then condensed inside the secondary vessel. After the remaining source water is drained out of the primary vessel, the first water portion in its liquid state is transferred into the primary vessel and poured onto the second water portion in its solid state, which melts the first water portion and the second water portion together to be a quantity of purified water.

20 Claims, 20 Drawing Sheets

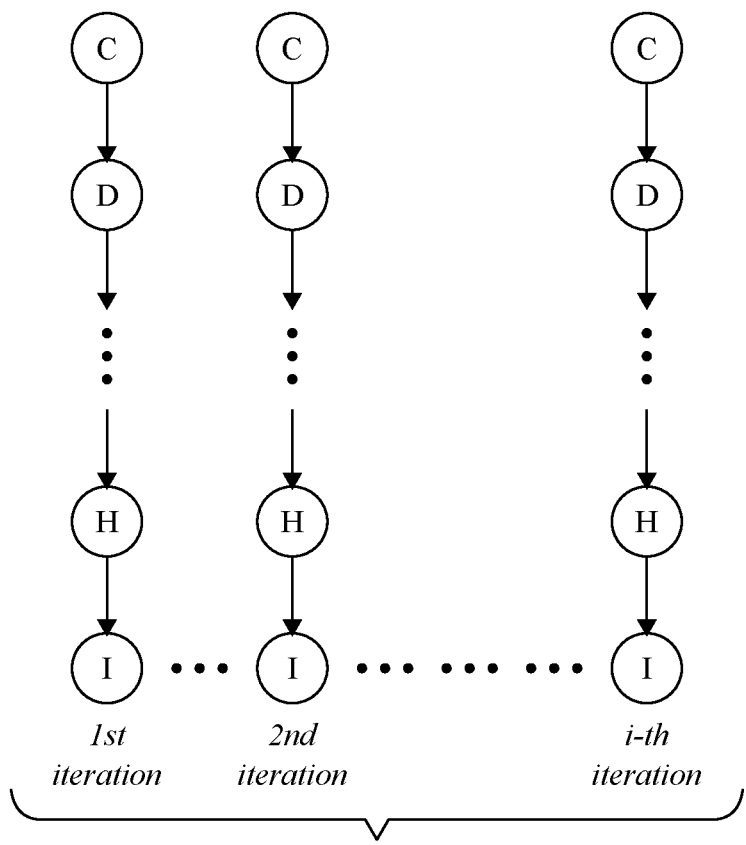

Providing the at least one primary vessel as a plurality of primary vessels, wherein each primary vessel comprises a vessel body, a gravitationally-higher side, a gravitationally-lower side, and a product valved outlet, and wherein the gravitationally-higher side and the gravitationally-lower side are positioned opposite to each other about the vessel body, and wherein the product valved outlet is positioned proximal to the gravitationally-lower side and is positioned distal to the gravitationally-higher side, and wherein each adjacent pair from the plurality of primary vessels comprises a gravitationally-higher primary vessel and a gravitationally-lower primary vessel, and wherein the product valved outlet of the gravitationally-higher primary vessel is in fluid communication with the gravitationally-higher side of the gravitationally-lower primary vessel

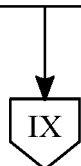

SYSTEM AND METHOD OF DISTILLING/DESALINATING WATER IN A VACUUM-APPLIED MULTI-PHASE MANNER

FIELD OF THE INVENTION

The present invention generally relates to purifying water of contaminants. More specifically, the present invention uses a vacuum to evaporate some portion of water and to freeze some other portion of water, which purifies the evaporated and frozen portions of water.

BACKGROUND OF THE INVENTION

Humankind's demand on Earth's freshwater sources is increasing over time with population growth and increased living standards. Earth's freshwater sources are depleting at higher rates, while Earth's rates of freshwater replenishment are largely unchanged. Desalination of seawater for freshwater use is an attractive solution to humankind's future freshwater needs; however, the current state of available desalination technologies is both energy-intensive and cost-intensive. Thus, there is a need for a more sustainable and energy efficient desalination method to help solve humankind's future freshwater needs.

The Earth currently replenishes freshwater naturally through evaporation-precipitation methods, whereby water is desalinated/purified through evaporation and supplied via precipitation in the liquid-phase (rain) or solid-phase (snow). Additionally, ocean water freezes in locations with low enough temperatures, which allow for a lower salinity when frozen. Evaporation is driven by energy from the sun and heat transfer across the different phases of water is exchanged and maintained by the Earth's atmosphere.

The present invention applies methods similar to the purification process of the Earth's natural freshwater cycle, utilizing multiple phases of water for desalination/purification and managing the heat transfer across each phase. The present invention increases the rate of freshwater production using vacuum technology and reduces the energy requirement by utilizing the inherent heat transfer properties of each phase to drive the functioning of the present invention in a sustainable, cost-effective, and energy efficient manner. The goal of the present invention is to provide a sustainable distilling/desalination system and method that can be used to meet humankind's future freshwater needs.

SUMMARY OF THE INVENTION

The present invention is a novel water treatment process that separates water from dissolved and non-dissolved constituents, primarily salt. The present invention combines different separation technologies that utilize water in the liquid-phase, gas-phase, and solid-phase to desalinate and purify the water. Furthermore, the inherent energy transfer properties of these different technologies are utilized to drive the functioning of the present invention in a sustainable manner.

The main objective of the present invention is distilling/desalinating seawater for potable water production; however, the present invention inherently separates/purifies water from any form of dissolved or non-dissolved constituents, introducing alternative applications such as, but not limited to, the following:

Desalination of seawater for potable water production
Treatment of wastewater streams to purify water
Treatment of stormwater streams to purify water
Treatment of industrial and contaminated water streams to purify water
Separation processes involving water from dissolved and non-dissolved constituents Potential applications of the present invention cover any process whereby separation/purification of water from a constituent-containing water body of any volume is desired.

BRIEF DESCRIPTION OF THE DRAWINGS

FIG. 15 is a flowchart illustrating a subprocess for using the multi-stage embodiment for the system of the present invention.

DETAILED DESCRIPTION OF THE INVENTION

All illustrations of the drawings are for the purpose of describing selected versions of the present invention and are not intended to limit the scope of the present invention.

Figure 1:
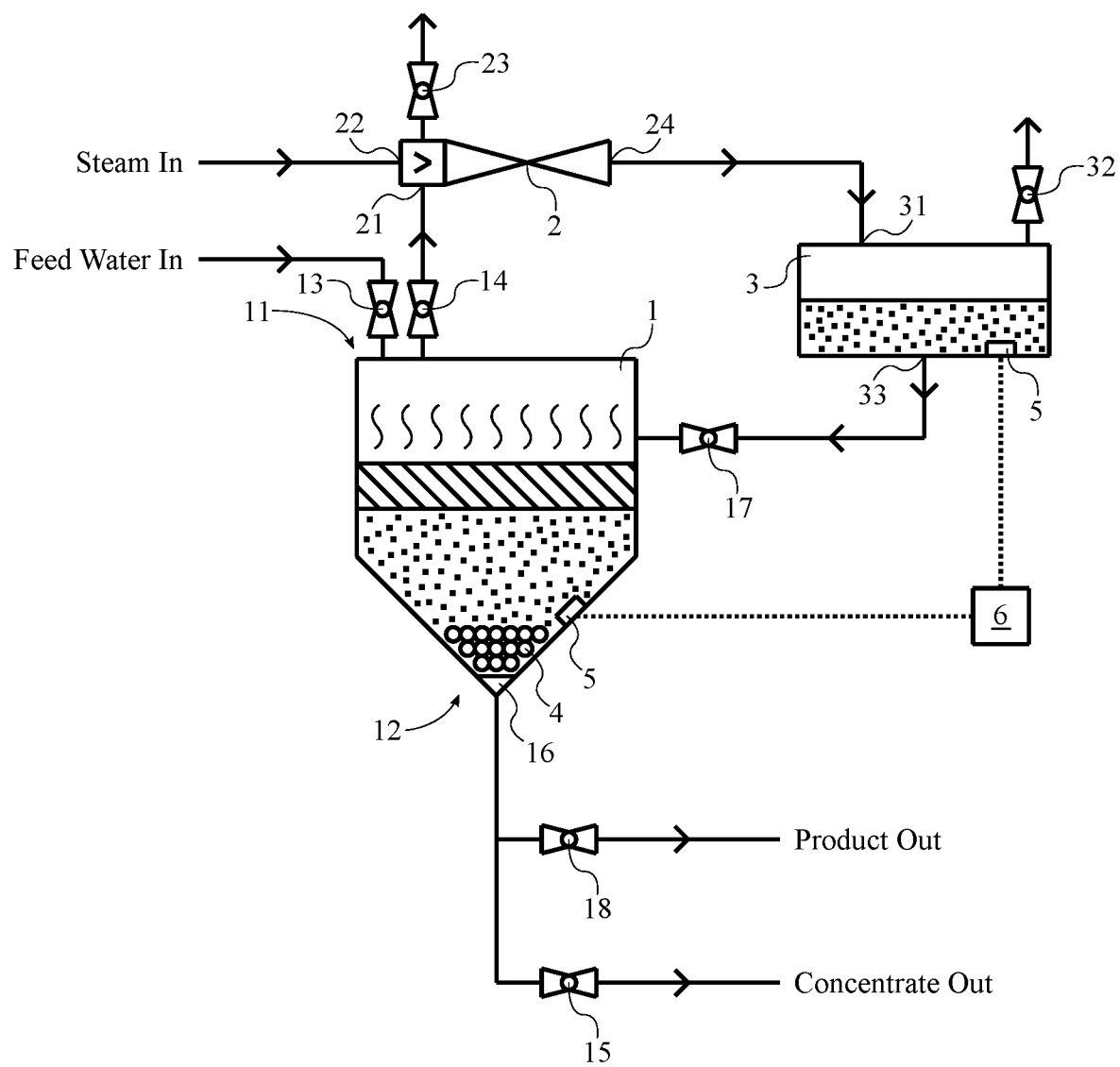
FIG. 1 is a block diagram illustrating the system of the present invention.

The present invention is a system and a method of distilling/desalinating water in a vacuum-applied multi-phase manner. The present invention is able to distill/desalinate a quantity of water by evaporating some portions of the quantity of water and by freezing some other portions of the quantity of water. As can be seen in FIG. 1, the system of the present invention is provided with at least one primary vessel 1, at least one vacuum apparatus 2, and at least one secondary vessel 3 (Step A), each of which can be made of metallic or non-metallic materials, can handle a wide range of temperatures (i.e., temperatures ranging from the freezing point of water to the boiling point of water), and can be any geometric configuration. The primary vessel 1 and the secondary vessel 3 are used to retain the water at different stages of the distilling/desalinating process and are preferably thermally-insulated vessels. More specifically, the thermally-insulated vessels are double-walled vessels, each of which has a vacuum retained between its double walls. Alternatively, each double-wall vessel can have another kind of material with a low heat-transfer value that is retained between its double walls (i.e., foam insulation). The primary vessel 1 and the secondary vessel 3 are in fluid communication with the vacuum apparatus 2 so that the vacuum apparatus 2 is able to move a fluid from the primary vessel 1 into the secondary vessel 3. The primary vessel 1 and the secondary vessel 3 are also in fluid communication with each other so that a fluid can freely move from the secondary vessel 3 back into the primary vessel 1. The primary vessel 1, the secondary vessel 3, and the vacuum apparatus 2 can also work as a closed system when the vacuum apparatus 2 is generating a vacuum but can selectively vent the closed system to outside atmosphere at specific areas and/or times if necessary. The vacuum apparatus 2 can be, but is not limited to, a vacuum ejector, a turbine, or a rotary-vane pump. In addition, a quantity of source water is retained by the primary vessel 1 (Step B) and is the water that needs to be separated from its dissolved and/or undissolved contaminants by the present invention.

Figure 4:
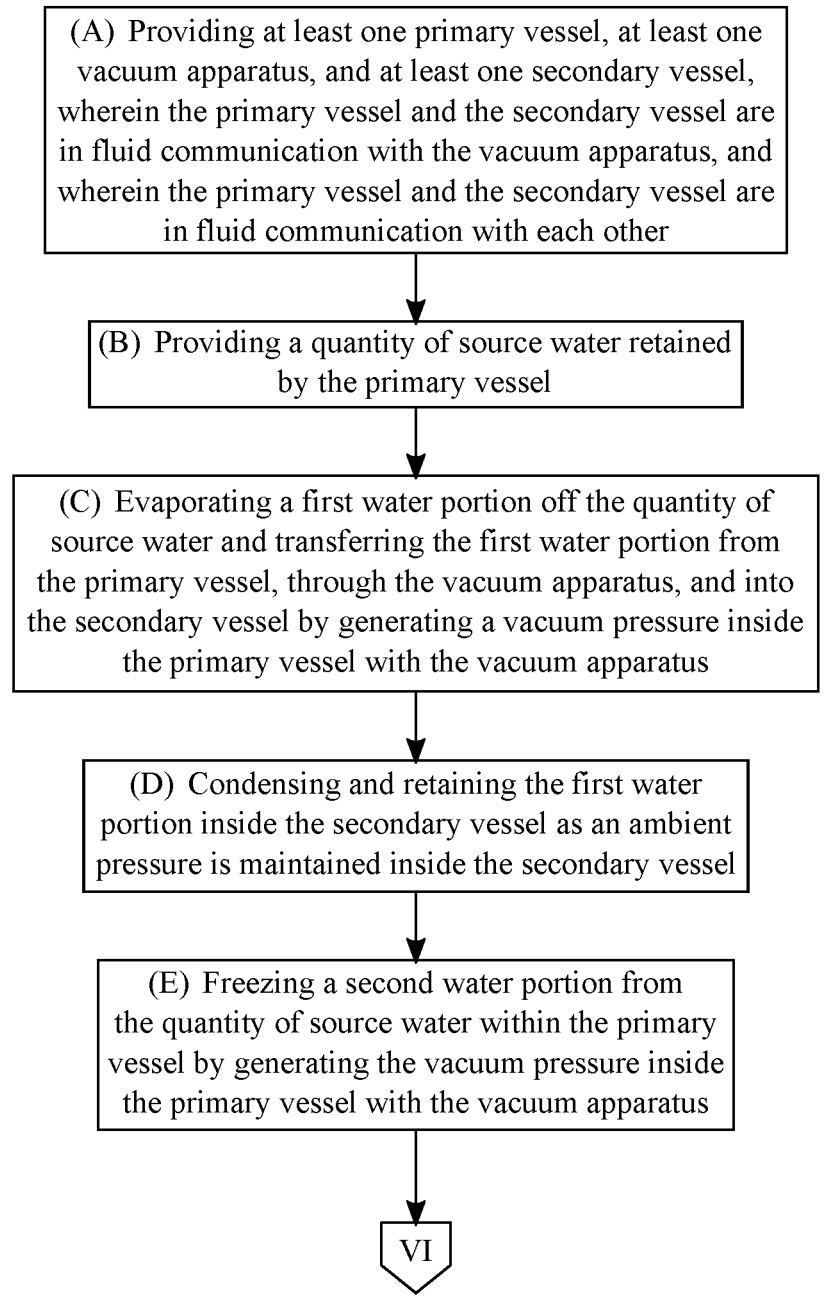
FIG. 4 is a flowchart illustrating an overall process for the method of the present invention.
Figure 5:
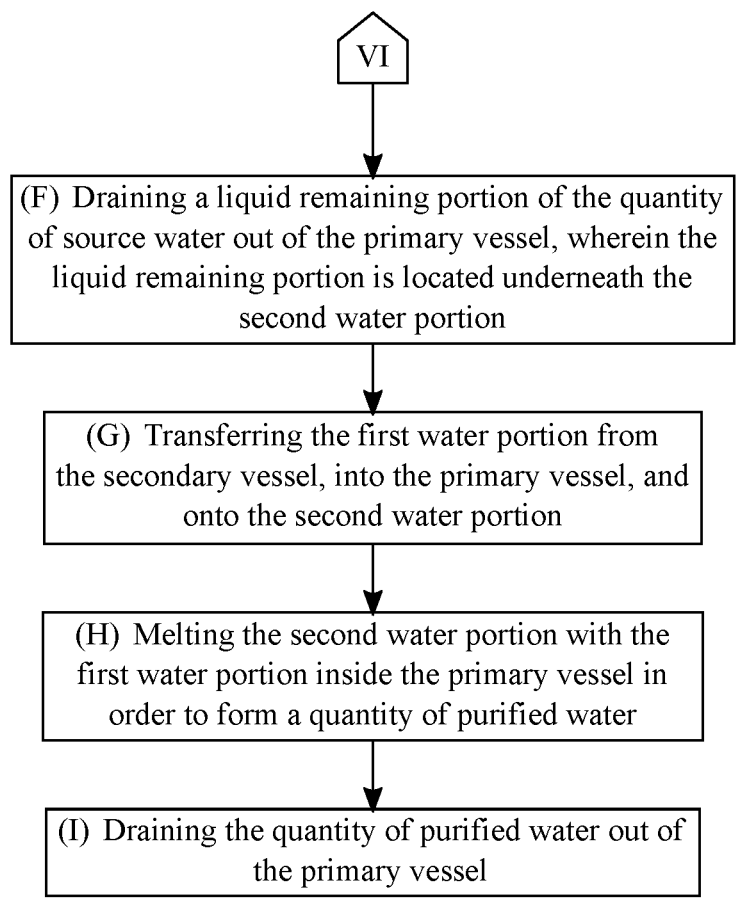
FIG. 5 is a continuation of FIG. 4.

As can be seen in FIGS. 4 and 5, an overall process for the method of the present invention allows water to be distilled/desalinated by having the water go through multiple phase changes. The overall process begins by evaporating a first water portion off the quantity of source water and transferring the first water portion from the primary vessel 1, through the vacuum apparatus 2, and into the secondary vessel 3 by generating a vacuum pressure inside the primary vessel 1 with the vacuum apparatus 2 (Step C). The vacuum pressure generated inside the primary vessel 1 reduces a boiling temperature for the quantity of source water, which allows the first water portion to evaporate off the quantity of source water at an ambient temperature and allows the first water portion to be distilled/desalinated of its dissolved and/or undissolved contaminants. The first water portion in its gas state is consequently able to travel from the primary vessel 1, through the vacuum apparatus 2, and to the secondary vessel 3. The overall process continues by condensing and retaining the first water portion inside the secondary vessel 3 as an ambient pressure is maintained inside the secondary vessel 3 (Step D). The ambient pressure inside the secondary vessel 3 returns a condensation temperature of the first water portion to be approximately 373 degrees Kelvin at normal temperature and pressure (NTP). The first water portion in its liquid state is consequently collected and retained until later in the overall process. In addition, the vacuum pressure generated inside the primary vessel 1 with the vacuum apparatus 2 is used to freeze a second water portion from the quantity of source water within the primary vessel 1 (Step E) because a substantial amount of thermal energy is removed from the quantity of source water as the first water portion is evaporated off the quantity of source water (i.e., the latent heat of vaporization) and eventually releases this substantial amount of thermal energy in the secondary vessel 3 during Step D (i.e., the latent heat of condensation). The second water portion in its solid state is consequently suspended within the primary vessel 1 as a layer of ice. The freezing of the second water portion also distills/desalinates the second water portion of its dissolved and/or undissolved contaminants by pushing its dissolved and/or undissolved contaminants out of the second water portion as ice crystals are formed from the second water portion.

After phase changing portions of the quantity of source water between different states of matter in order to distill/desalinate those portions, the overall process continues by draining a liquid remaining portion of the quantity of source water out of the primary vessel 1 (Step F), which leaves only the second water portion in its solid state suspended within the primary vessel 1. The liquid remaining portion is located underneath the second water portion because the second water portion in its solid state forms as a top layer of ice on the liquid remaining portion. The liquid remaining portion also acts as a repository for the dissolved and/or undissolved contaminants that were removed from the first water portion and the second water portion. The overall process continues by transferring the first water portion from the secondary vessel 3, into the primary vessel 1, and onto the second water portion (Step G) so that the first water portion in its liquid state is in physical contact with the second water portion. Consequently, the first water portion is used to melt the second water portion, and the first water portion and the second water portion in their liquid states mix together in order to form a quantity of purified water (Step H), and the quantity of purified water is the combined portions of the quantity of source water that were distilled/desalinated of its dissolved and/or undissolved contaminants. The overall process concludes by draining the quantity of purified water out of the primary vessel 1 (Step I) so that the quantity of purified water can be used as an end product of the present invention.

In order to describe how the fluid flow is valved within the system of the present invention, the primary vessel 1 is provided with a gravitationally-higher side 11 and a gravitationally-lower side 12, which are shown in FIG. 1. The gravitationally-higher side 11 is the side of the primary vessel 1 that is the farthest from the ground, while the gravitationally-lower side 12 is the side of the primary vessel 1 that is the closest to the ground. Thus, the gravitationally-higher side 11 and the gravitationally-lower side 12 need to be positioned opposite to each other about the primary vessel 1.

Figure 6:
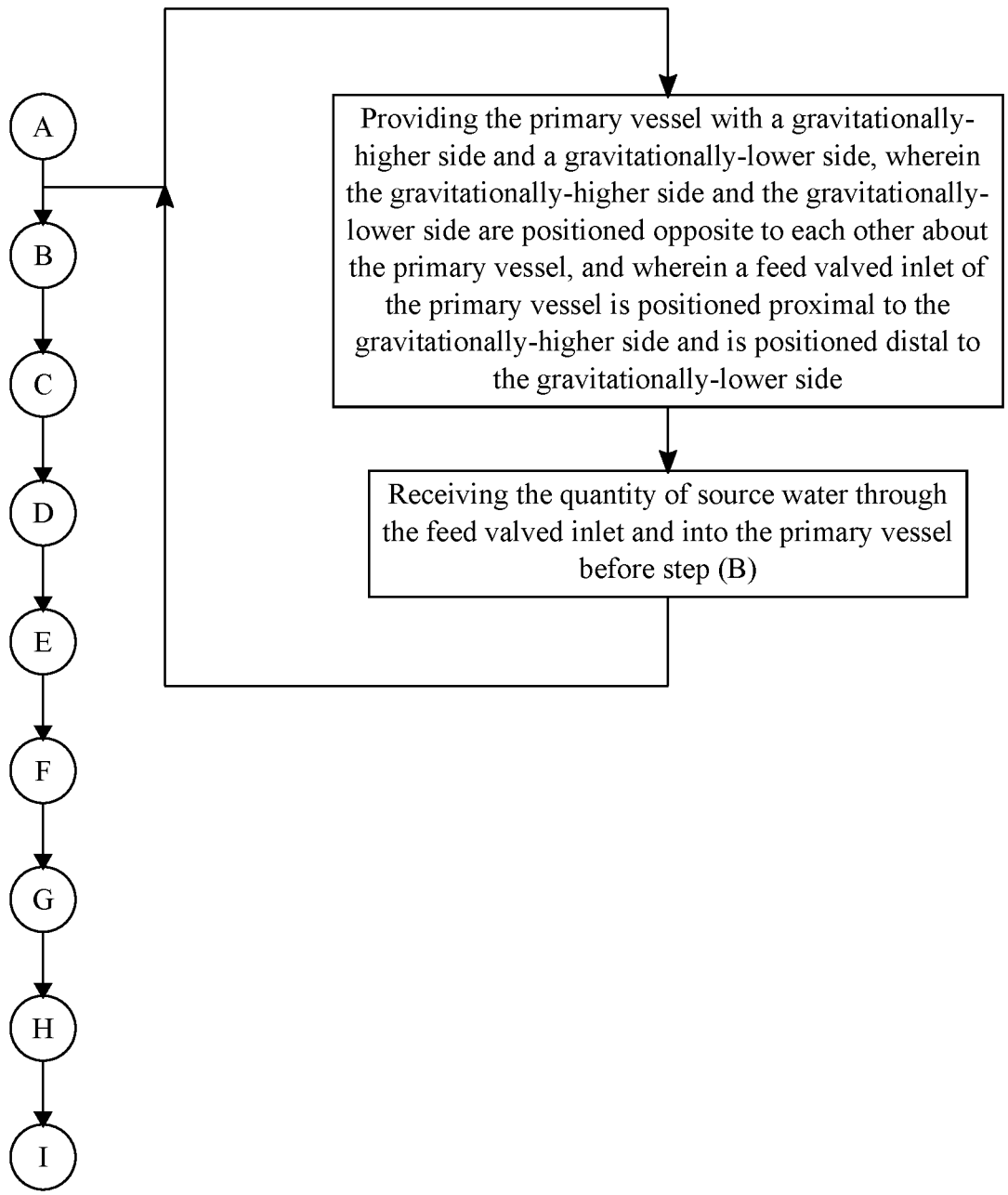
FIG. 6 is a flowchart illustrating a subprocess for filling the primary vessel with the quantity of source water.

As can be seen in FIGS. 1 and 6, a feed valved inlet 13 of the primary vessel 1 is an inlet that can be selectively opened or closed in order to fill the primary vessel 1 with untreated water containing dissolved and/or undissolved contaminants. The feed valved inlet 13 is positioned proximal to the gravitationally-higher side 11 and is positioned distal to the gravitationally-lower side 12, which allows the primary vessel 1 to be initially filled from its top. Thus, the quantity of source water is received through the feed valved inlet 13 and into the primary vessel 1 before Step B. The quantity of source water is preferably retrieved from a natural source of untreated water (e.g., a source of seawater or freshwater) and/or from a recycled source of untreated water (e.g., the liquid remaining portion from a previous iteration of the overall process). The quantity of source water is then preferably retained within a feed tank until the feed valved inlet 13 is opened to fill the primary vessel 1 with the quantity of source water.

Figure 7:
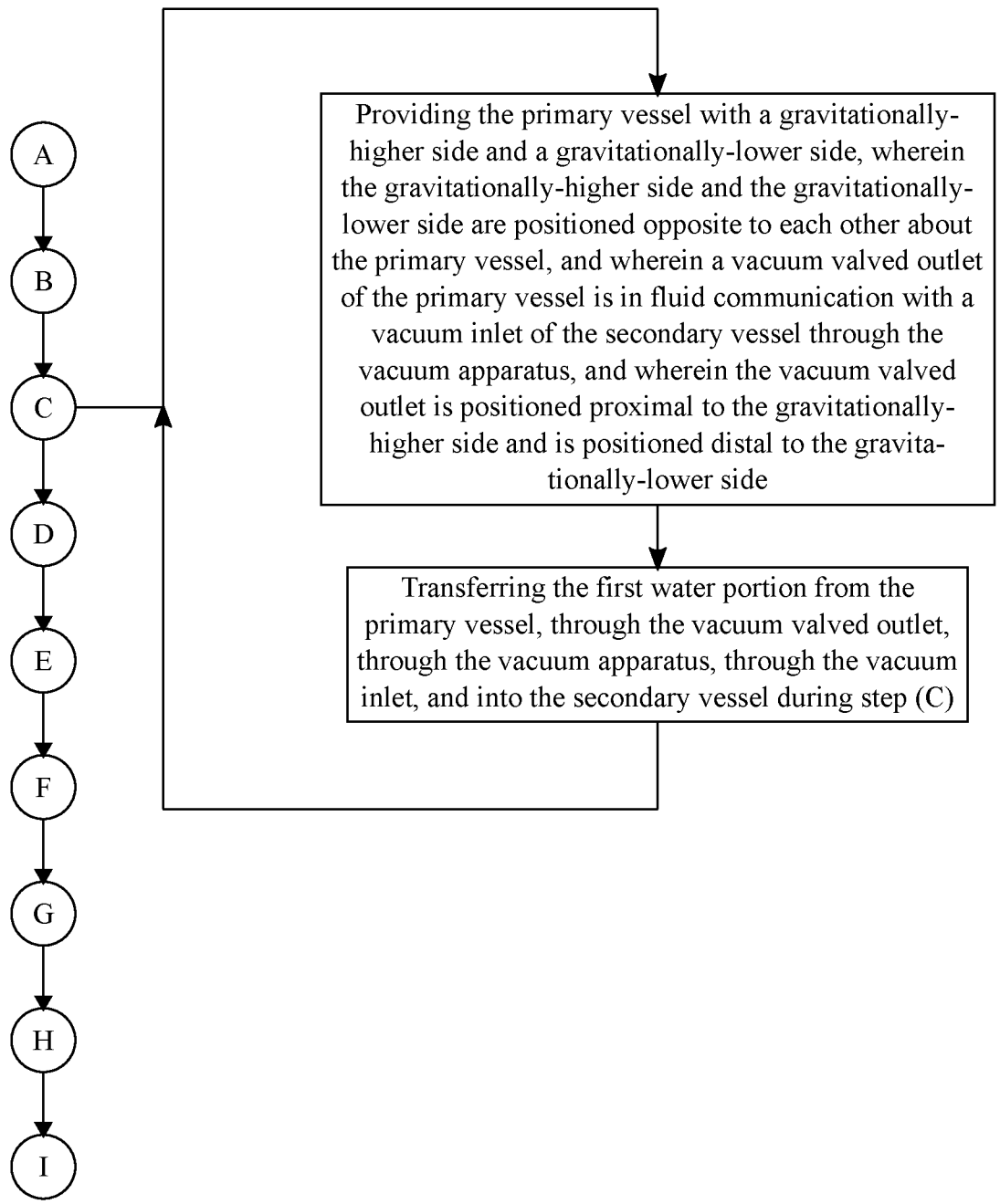
FIG. 7 is a flowchart illustrating a subprocess for transferring the first water portion into the secondary vessel.

As can be seen in FIGS. 1 and 7, a vacuum valved outlet 14 of the primary vessel 1 is an outlet that can be selectively opened or closed in order to release the first water portion in its gas state from the primary vessel 1, while a vacuum inlet 31 of the secondary vessel 3 is an inlet that remains opens in order to fill the secondary vessel 3 with the first water portion in its gas state. The vacuum valved outlet 14 is in fluid communication with the vacuum inlet 31 through the vacuum apparatus 2, which allows a fluid to be driven from the primary vessel 1, through the vacuum apparatus 2, and into the secondary vessel 3. Moreover, the vacuum valved outlet 14 is positioned proximal to the gravitationally-higher side 11 and is positioned distal to the gravitationally-lower side 12, which allows a gas to naturally rise and be released out of the primary vessel 1. Thus, the first water portion is transferred from the primary vessel 1, through the vacuum valved outlet 14, through the vacuum apparatus 2, through the vacuum inlet 31, and into the secondary vessel 3 during Step C.

Figure 8:
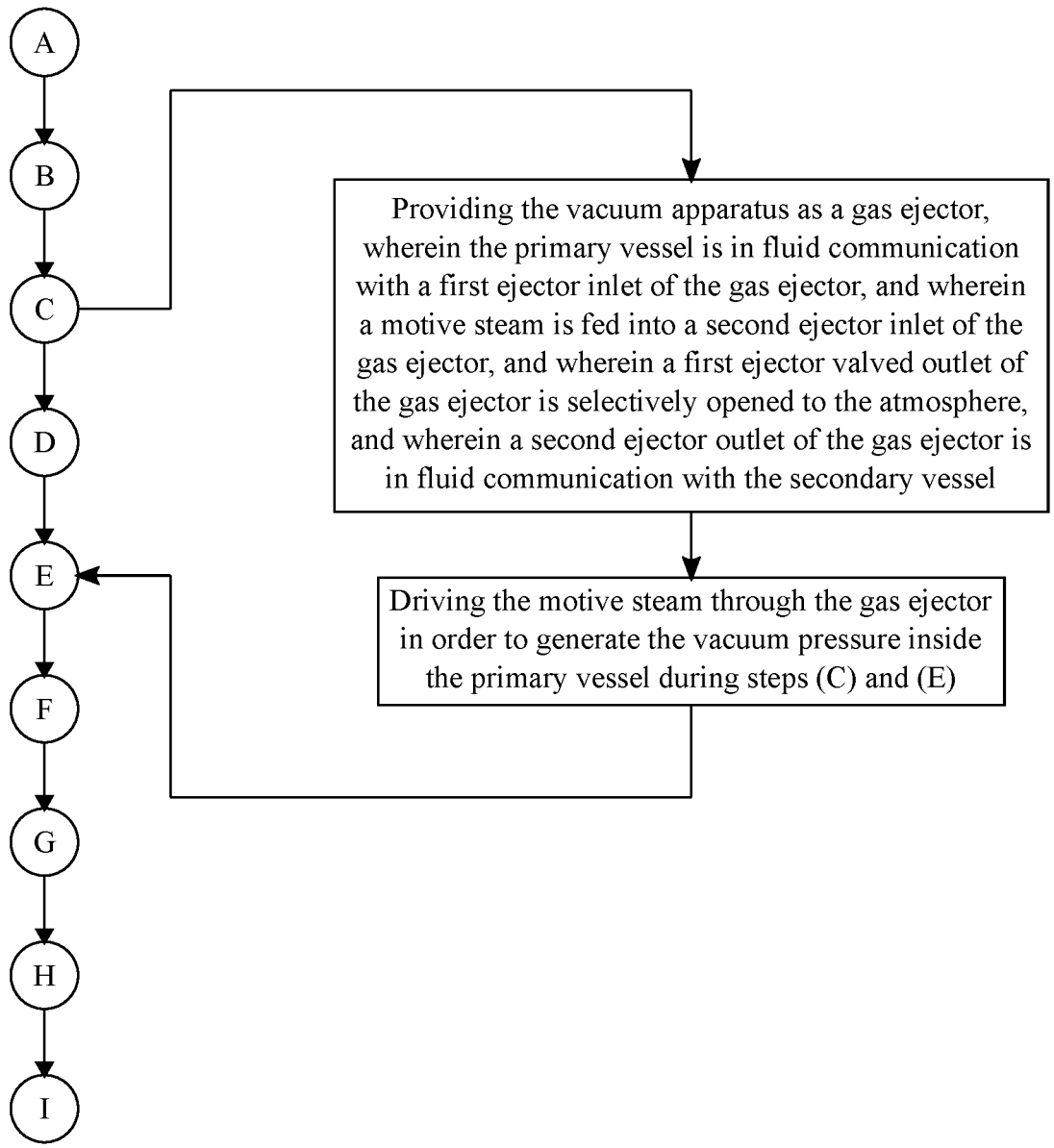
FIG. 8 is a flowchart illustrating a subprocess for driving the first water portion through the vacuum apparatus.

As can be seen in FIGS. 1 and 8, the vacuum apparatus 2 acts as an engine to drive the transfer movement of the first water portion in its gas state from the primary vessel 1 and into the secondary vessel 3. The vacuum apparatus 2 is preferably a gas ejector that produces a vacuum by means of the Venturi effect. Thus, the gas ejector comprises a first ejector inlet 21, a second ejector inlet 22, a first ejector valved outlet 23, and a second ejector outlet 24. The primary vessel 1 is in fluid communication with the first ejector inlet 21, which allows the gas ejector to receive the first water portion in its gas state from the primary vessel 1. A motive steam is fed into the second ejector inlet 22 and is used to drive the movement of the first water portion in its gas state from the primary vessel 1, through the vacuum apparatus 2, and into the secondary vessel 3. The motive steam may also supplement the first water portion in its gas state with additional thermal energy and additional liquid-phase volume as the first water portion condenses into its liquid state. Alternatively, another kind of motive gas (e.g., air) can be used with the gas ejector instead of the motive steam. The first ejector valved outlet 23 is selectively opened or closed to the atmosphere in order to manage the fluid flow through the gas ejector. The second ejector outlet 24 is in fluid communication with the secondary vessel 3, which allows the gas ejector to deposit the first water portion in its gas state into the secondary vessel 3. Thus, the arrangement for the first ejector inlet 21, the second ejector inlet 22, the first ejector valved outlet 23, and the second ejector outlet 24 allows the motive steam to be driven through the gas ejector in order to generate the vacuum pressure inside the primary vessel 1 during Steps C and E. Furthermore, the system of the present invention may be further provided with a steam tank, which retains enough steam gas to feed the motive steam into the second ejector inlet 22. The secondary vessel 3 may also be in fluid communication with the steam tank in order to transfer some of the unused steam within the secondary vessel 3 to the steam tank, which allows the unused steam to be recycled into the motive steam.

Figure 9:
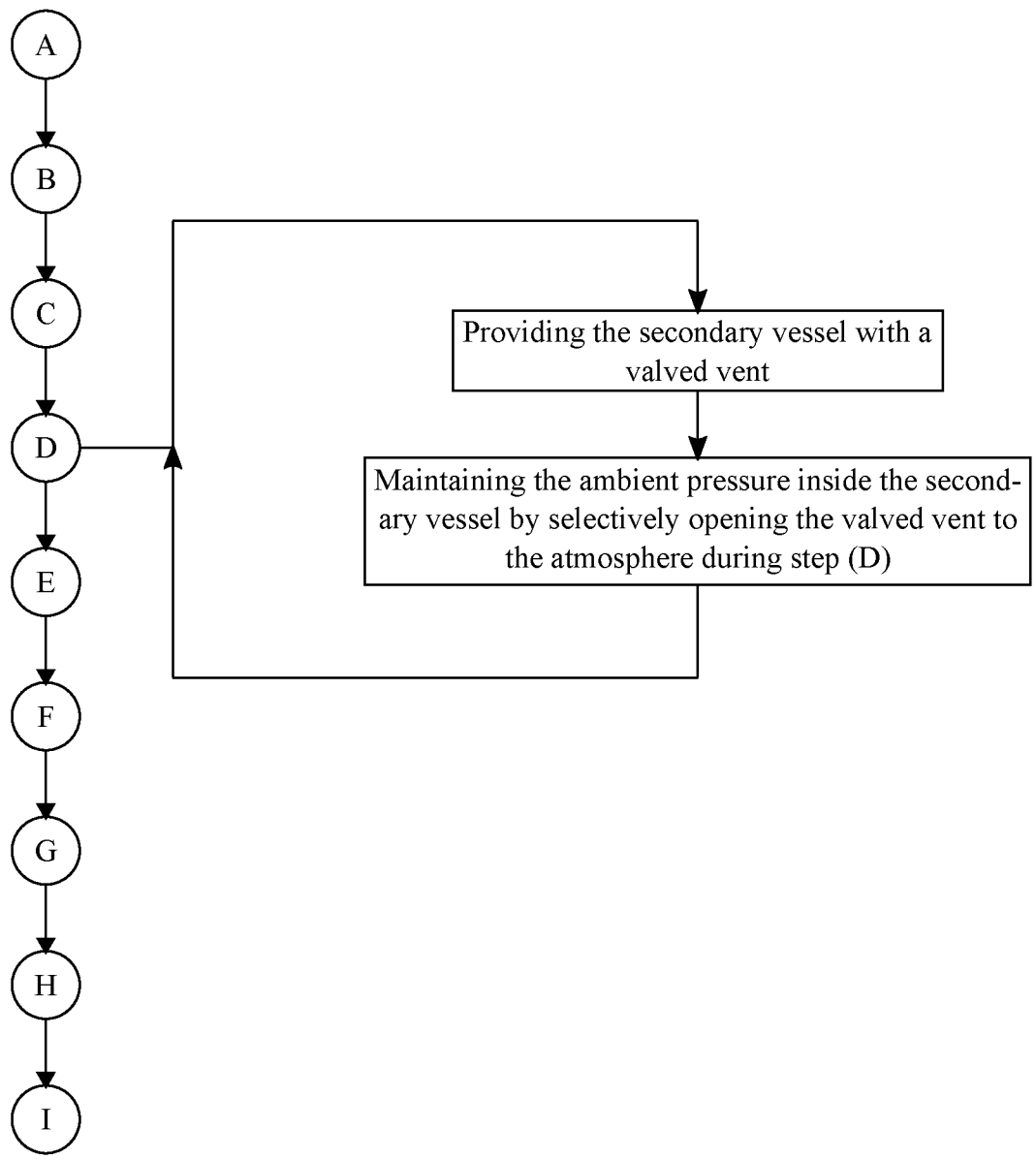
FIG. 9 is a flowchart illustrating a subprocess for venting the secondary vessel.

As can be seen in FIGS. 1 and 9, the secondary vessel 3 is preferably provided with a valved vent 32 that is used to readily release an excess amount of pressure from the secondary vessel 3. The excess amount of pressure may be a result of accumulating the first water portion in its gas state. Thus, the ambient pressure inside the secondary vessel 3 is maintained by selectively opening the valved vent 32 to the atmosphere during Step D in order to prevent structural failure of the secondary vessel 3 from an excess amount of pressure.

Figure 10:
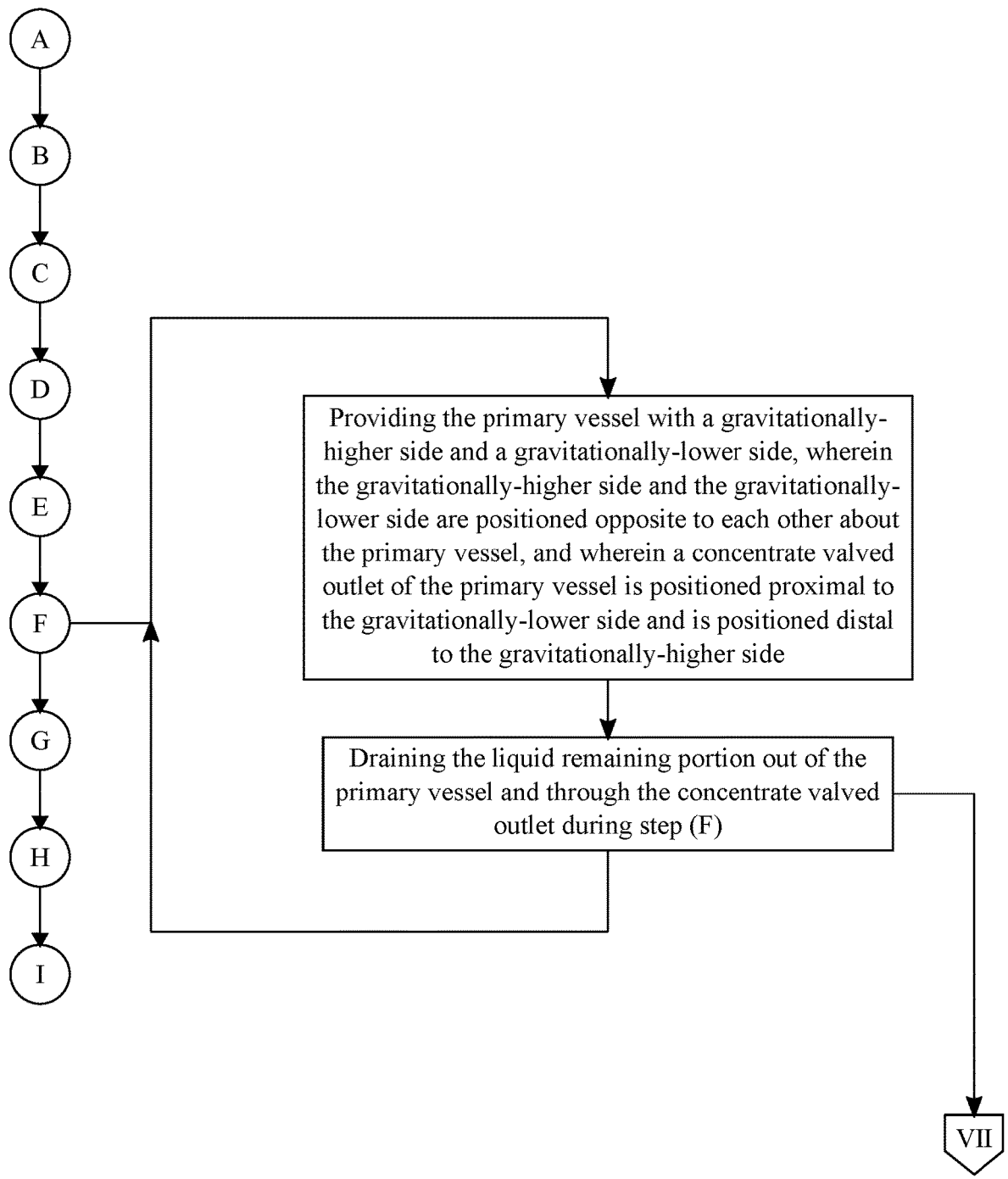
FIG. 10 is a flowchart illustrating a subprocess for draining the liquid remaining portion out of the primary vessel.
Figure 11:
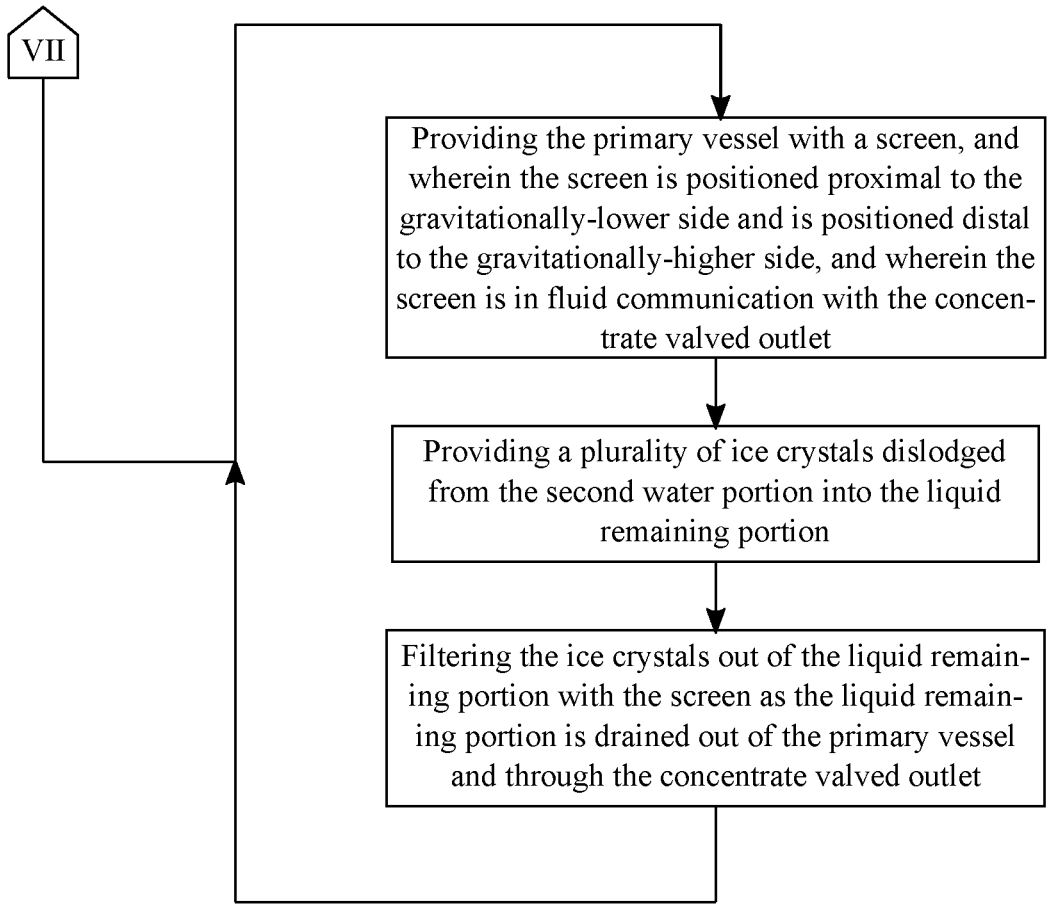
FIG. 11 is a flowchart illustrating a subprocess for filtering ice crystals out of the liquid remaining portion.

As can be seen in FIGS. 1 and 10, a concentrate valved outlet 15 of the primary vessel 1 is an outlet that can be selectively opened or closed in order to release the untreated water with its dissolved and/or undissolved contaminants from the primary vessel 1 before combining the first water portion and the second water portion in their liquid states together. The concentrate valved outlet 15 is positioned proximal to the gravitationally-lower side 12 and is positioned distal to the gravitationally-higher side 11, which allows the untreated water to gravitationally drain out of the primary vessel 1. Thus, the liquid remaining portion is drained out of the primary vessel 1 and through the concentrate valved outlet 15 during Step F. The liquid remaining portion can then be sent to a waste repository or to a feed tank for the present invention, which would recycle the liquid remaining portion as the quantity of source water in a subsequent iteration of the overall process. Furthermore, the primary vessel 1 is provided with a screen 16, which is shown in FIGS. 1 and 11, and the screen 16 is used to collect certain particulate (e.g., ice crystals dislodged from the second water portion in its solid state) from a liquid exiting the primary vessel 1. The screen 16 is positioned proximal to the gravitationally-lower side 12 and is positioned distal to the gravitationally-higher side 11 so that the screen 16 can be in fluid communication with the concentrate valved outlet 15. This arrangement allows the screen 16 to strain a liquid being gravitationally drained out of the primary vessel 1. The screen 16 becomes useful if a plurality of ice crystals is dislodged from the second water portion in its solid state into the liquid remaining portion. Thus, the ice crystals can be filtered out of the liquid remaining portion with the screen 16 as the liquid remaining portion is drained out of the primary vessel 1 and through the concentrate valved outlet 15. The ice crystals can then remain on the screen 16 until later in the method of the present invention.

Figure 12:
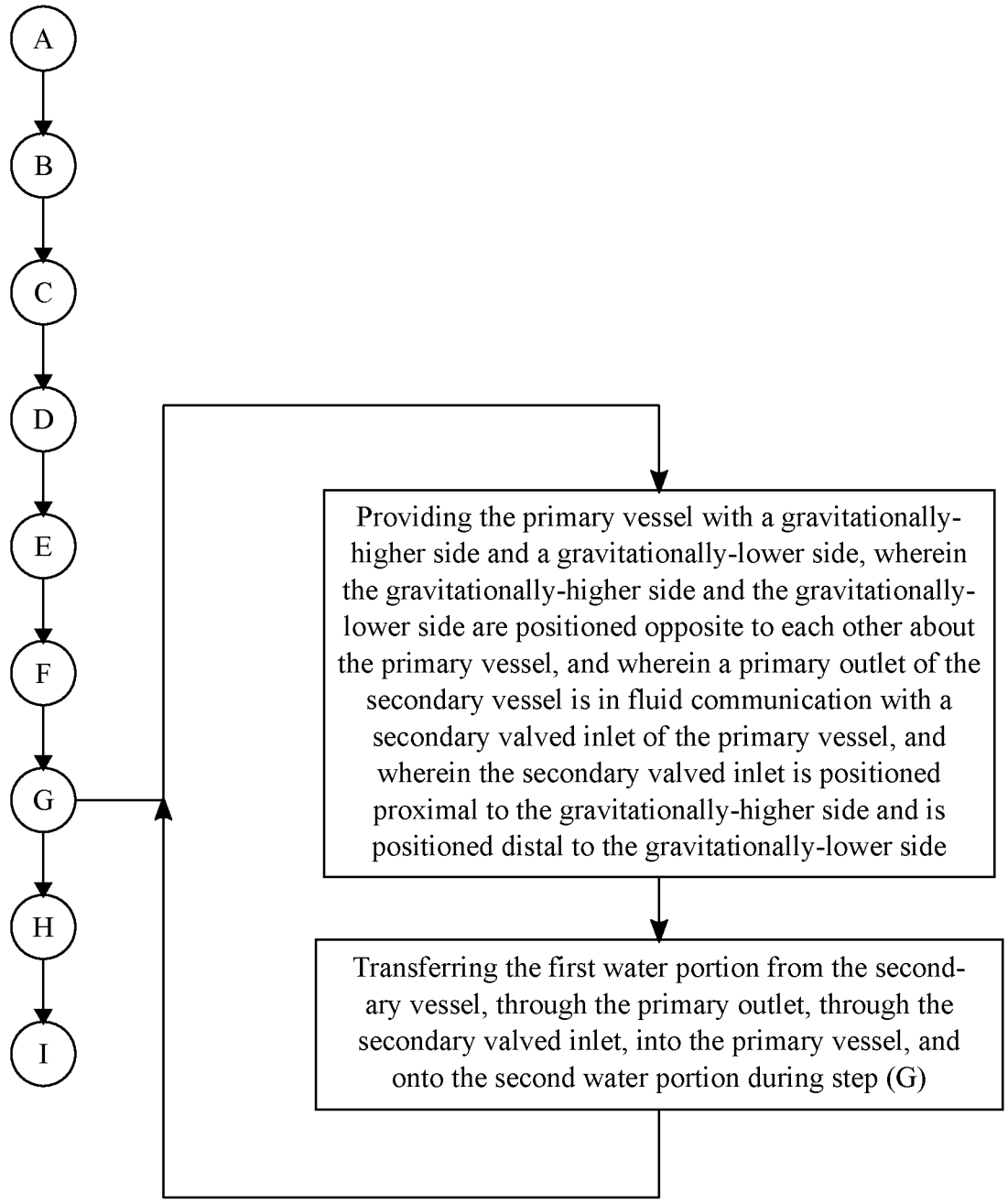
FIG. 12 is a flowchart illustrating a subprocess for transferring the first water portion back to the primary vessel.

As can be seen in FIGS. 1 and 12, a primary outlet 33 of the secondary vessel 3 is an outlet used to release the first water portion in its liquid state from the secondary vessel 3, while a secondary valved inlet 17 of the primary vessel 1 is an inlet that can be selectively opened or closed in order to receive the first water portion in its liquid state. The primary outlet 33 is in fluid communication with the secondary valved inlet 17, which allows a liquid to flow from the secondary vessel 3 back into the primary vessel 1. Moreover, the secondary valved inlet 17 is positioned proximal to the gravitationally-higher side 11 and is positioned distal to the gravitationally-lower side 12, which allows a liquid to pour into the primary vessel 1 from its top. Thus, the first water portion is transferred from the secondary vessel 3, through the primary outlet 33, through the secondary valved inlet 17, into the primary vessel 1, and onto the second water portion during Step G, which allows the first water portion in its liquid state to be poured onto the second water portion in its solid state.

Figure 13:
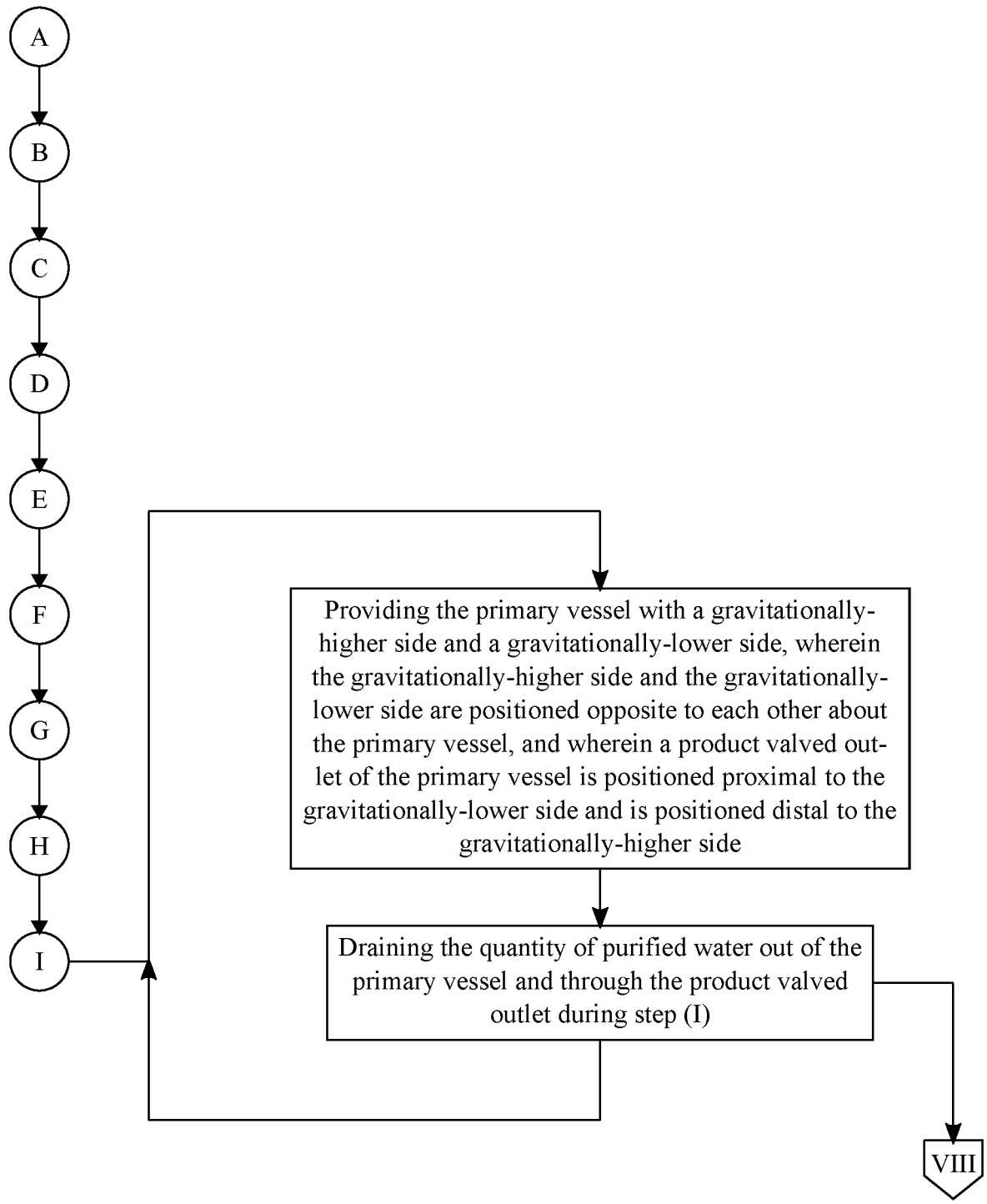
FIG. 13 is a flowchart illustrating a subprocess for draining the quantity of purified water out of the primary vessel.
Figure 14:
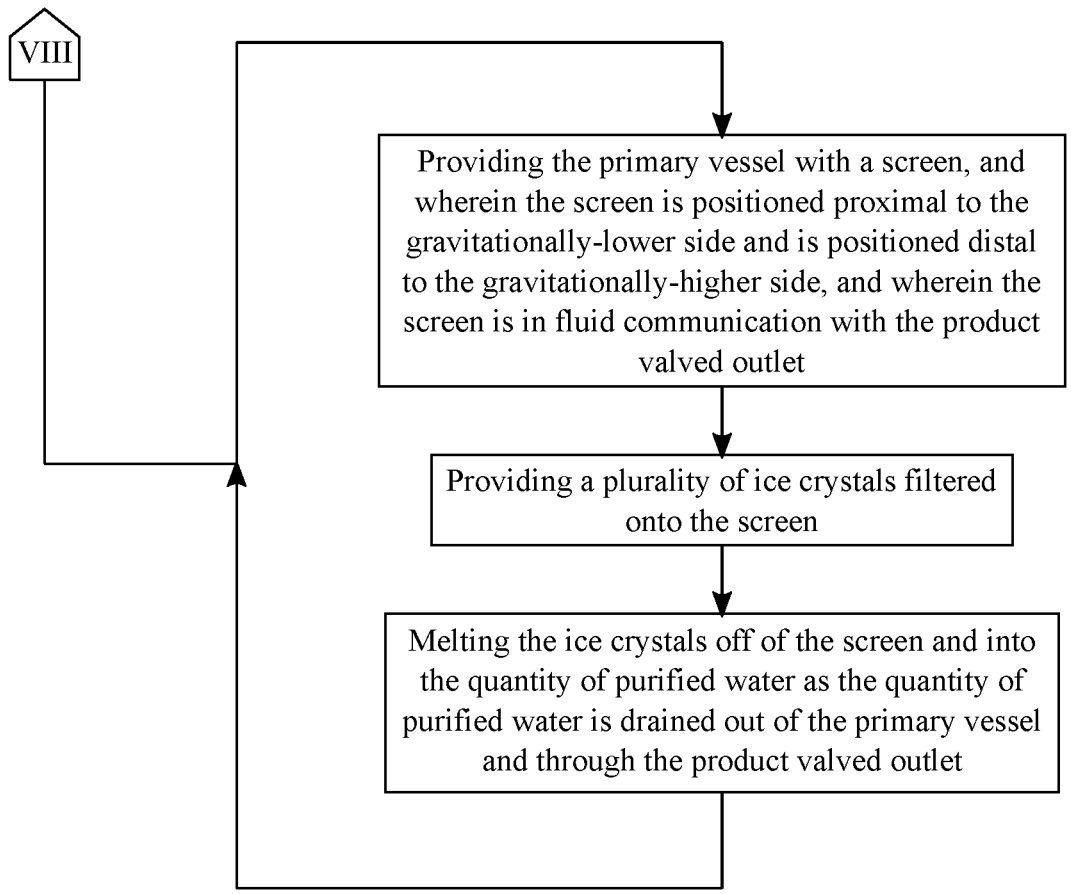
FIG. 14 is a flowchart illustrating a subprocess for melting the filtered ice crystals into the quantity of purified water.

As can be seen in FIGS. 1 and 13, a product valved outlet 18 of the primary vessel 1 is an outlet that can be selectively opened or closed in order to dispense the end product out of the present invention. The product valved outlet 18 is positioned proximal to the gravitationally-lower side 12 and is positioned distal to the gravitationally-higher side 11, which allows a liquid end product to gravitationally drain out of the primary vessel 1. Thus, the quantity of purified water is drained out of the primary vessel 1 and through the product valved outlet 18 during Step I. The quantity of purified water can then be sent to an end-product repository or to a water tap. Furthermore, similar to the concentrate valved outlet 15, the screen 16 is in fluid communication with the product valved outlet 18, which is shown in FIGS. 1 and 14, Thus, if a plurality of ice crystals has already been filtered onto the screen 16, the ice crystals can be melted off of the screen 16 and into the quantity of purified water as the quantity of purified water is drained out of the primary vessel 1 and through the product valved outlet 18, which allows for a larger quantity of end product by the present invention.

Figure 2:
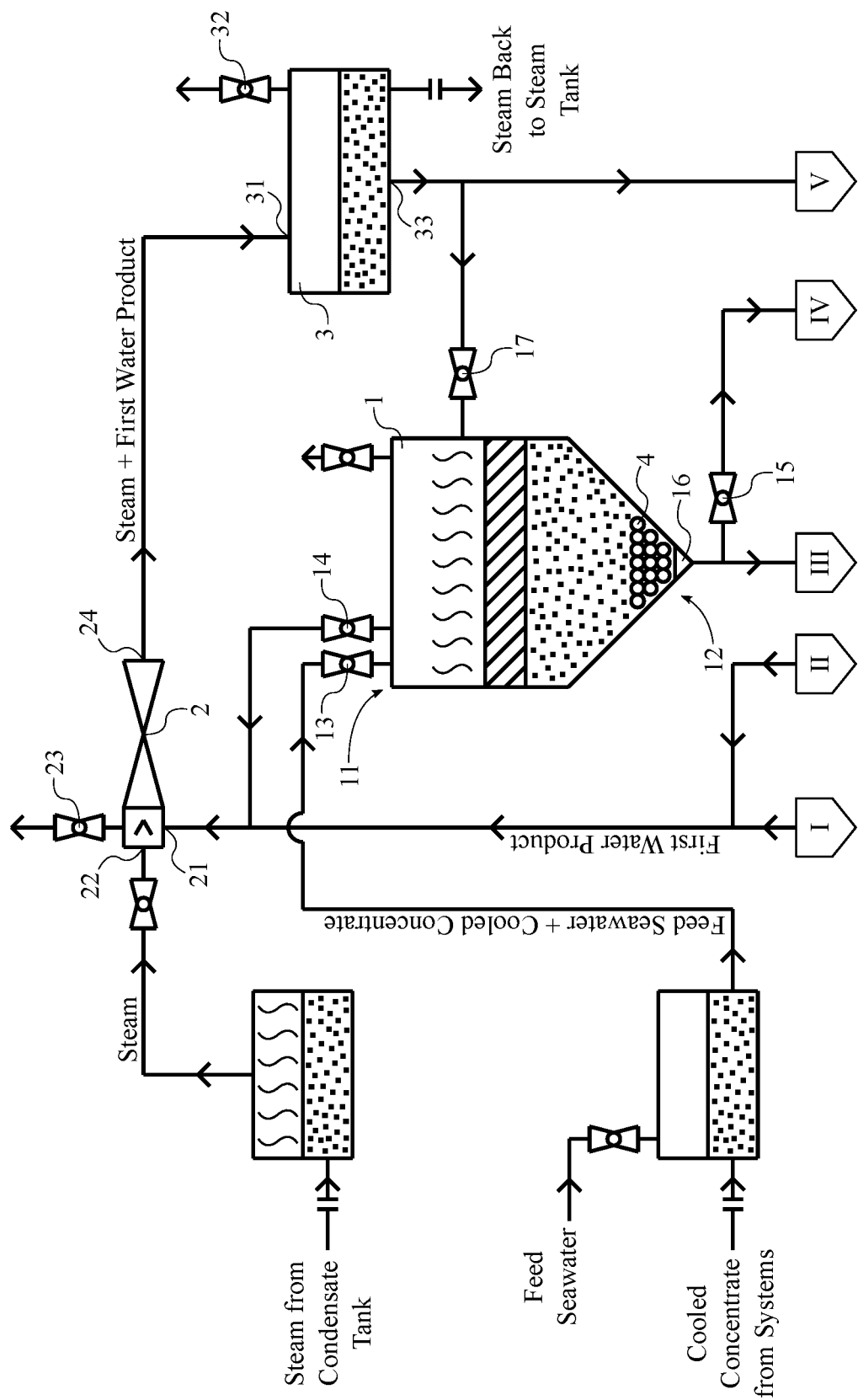
FIG. 2 is a block diagram illustrating a multi-stage embodiment for the system of the present invention.
Figure 3:
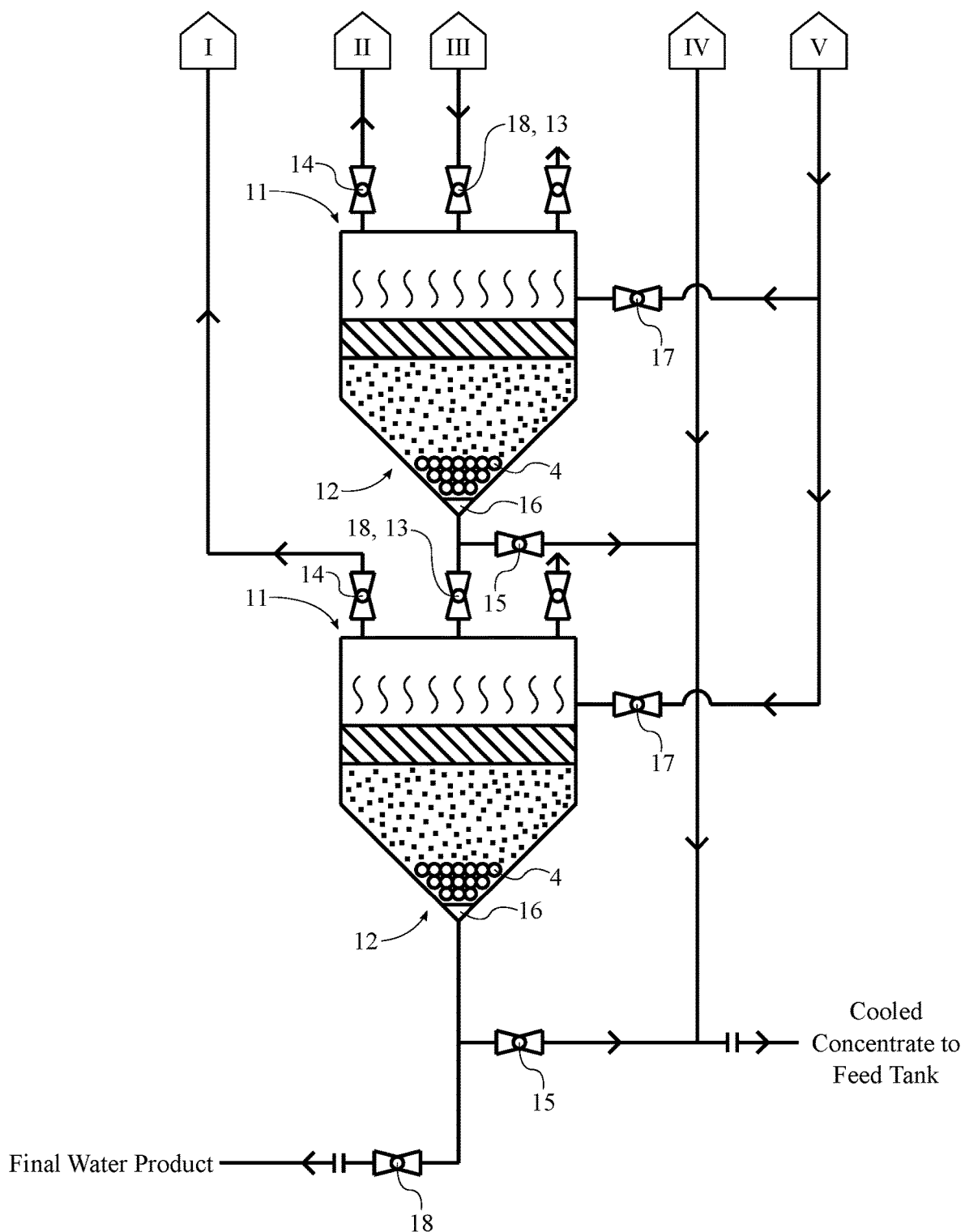
FIG. 3 is a continuation of FIG. 2.

As can be seen in FIGS. 2 and 3, a multi-stage embodiment by the present invention requires a more intricate setup for the system of the present invention. Thus, the at least one primary vessel 1 may be provided as a plurality of primary vessels, each of which comprises a vessel body, a gravitationally-higher side 11, a gravitationally-lower side 12, and a product valved outlet 18. The vessel body is the structural body of each primary vessel 1, which allows the gravitationally-higher side 11 and the gravitationally-lower side 12 to be positioned opposite to each other about the vessel body. As similarly described above, the product valved outlet 18 is positioned proximal to the gravitationally-lower side 12 and is positioned distal to the gravitationally-higher side 11. In addition, each adjacent pair from the plurality of primary vessels comprises a gravitationally-higher primary vessel (i.e., further from the ground) and a gravitationally-lower primary vessel (i.e., closer to the ground), which are two primary vessels stacked upon each other and consequently allow the product valved outlet 18 of the gravitationally-higher primary vessel to be in fluid communication with the gravitationally-higher side 11 of the gravitationally-lower primary vessel 1. Moreover, the plurality of primary vessels is in serial fluid communication with each other so that a first primary vessel from plurality of primary vessels is in fluid communication with a second primary vessel from the plurality of primary vessels, the second primary vessel is in fluid communication with a third primary vessel from the plurality of primary vessels, and so on.

Figure 16:
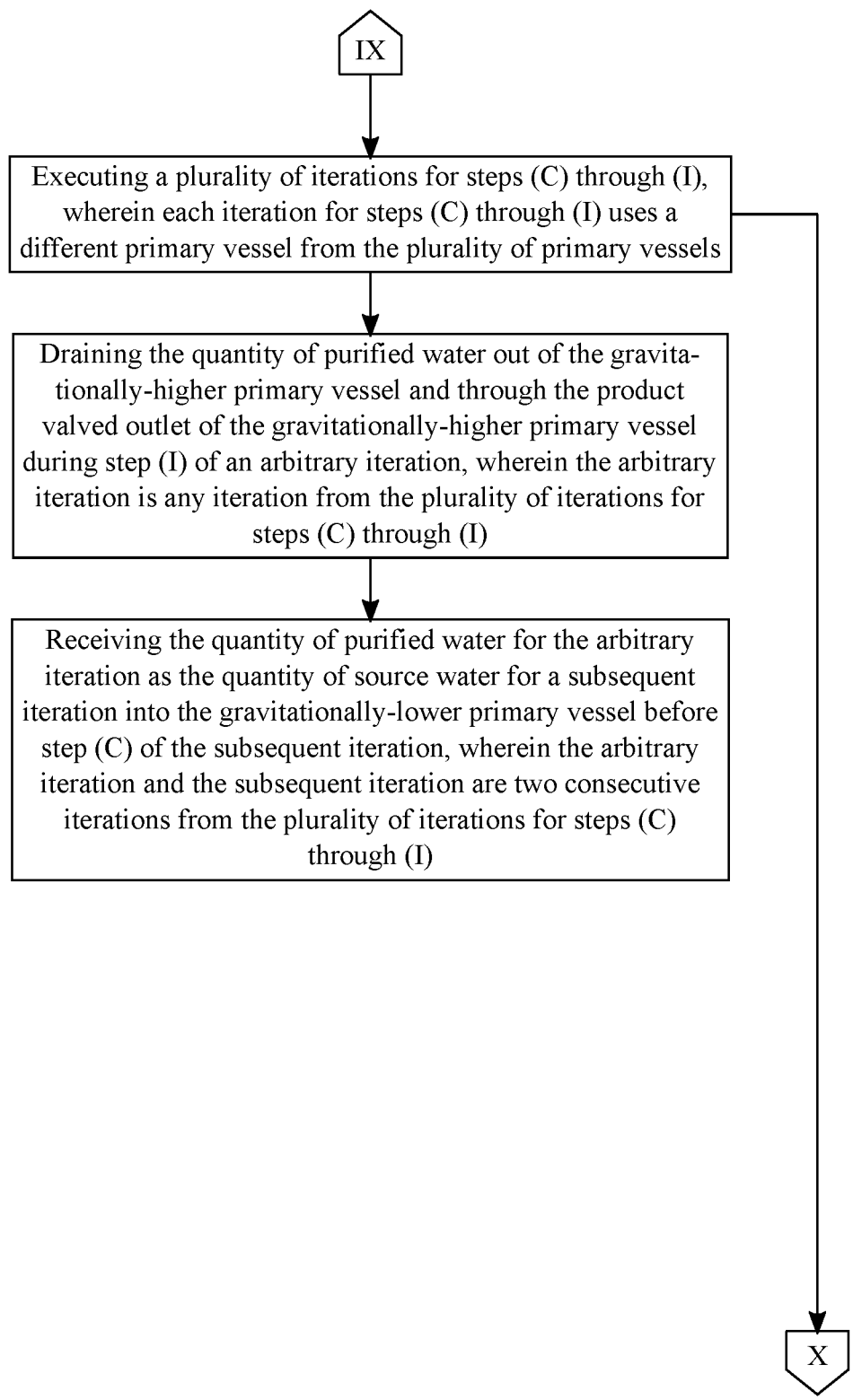
FIG. 16 is a continuation of FIG. 15.

As can be seen in FIGS. 15 and 16, this more intricate setup for the system of the present invention is used to execute a plurality of iterations for Steps C through I, wherein each iteration for Steps C through I uses a different primary vessel from the plurality of primary vessels. For example, a first primary vessel from the plurality of primary vessels is used during a first iteration from the plurality of iterations for Steps C through I, a second primary vessel from the plurality of primary vessels is then used during a second iteration from the plurality of iterations for Steps C through I, a third primary vessel from the plurality of primary vessels is then used during a third iteration from the plurality of iterations for Steps C through I, and so on. More specifically, the quantity of purified water is drained out of the gravitationally-higher primary vessel and through the product valved outlet 18 of the gravitationally-higher primary vessel during Step I of an arbitrary iteration. The arbitrary iteration is any iteration from the plurality of iterations for Steps C through I. The quantity of purified water for the arbitrary iteration is then received as the quantity of source water for a subsequent iteration into the gravitationally-lower primary vessel before Step C of the subsequent iteration. The arbitrary iteration and the subsequent iteration are two consecutive iterations from the plurality of iterations for Steps C through I. The steps taken while transitioning from the arbitrary iteration and the subsequent iteration allows the end product of the arbitrary iteration to be further purified through the subsequent iteration. Thus, the end product of a last iteration from the plurality of iterations for Steps C through I allows the present invention to achieve the best possible quality in its final quantity of purified water.

Figure 17:
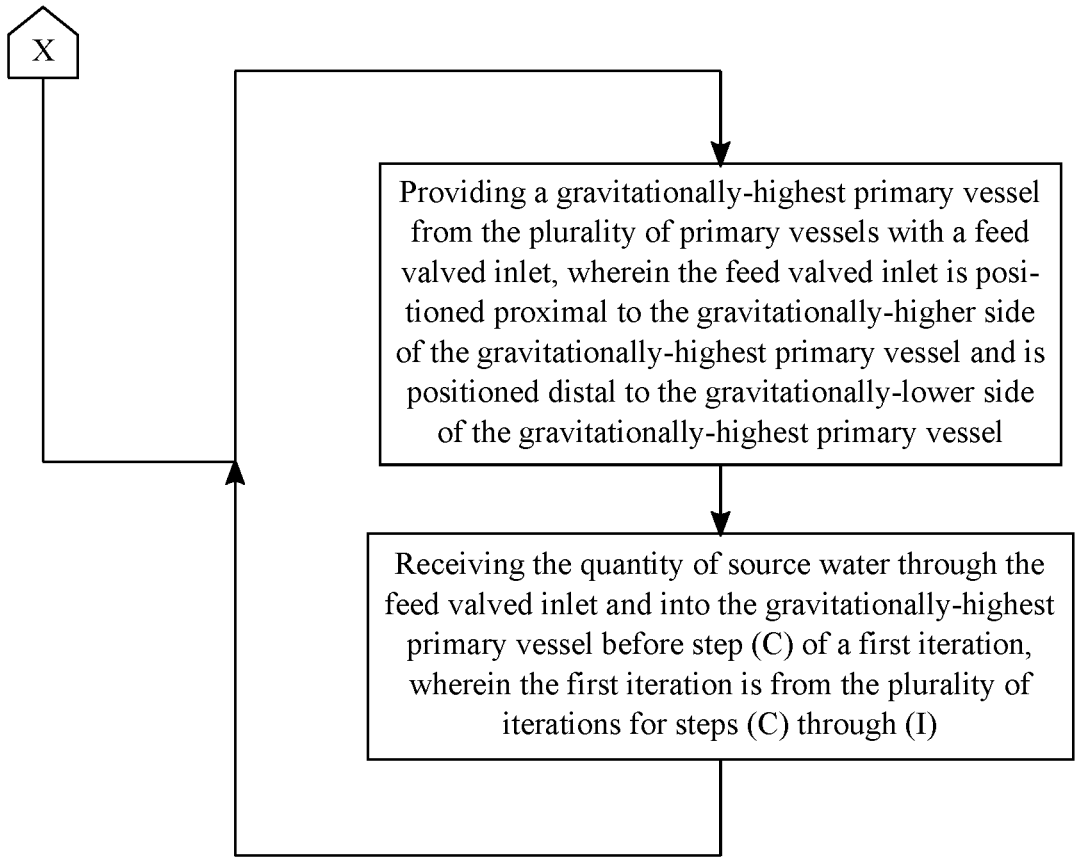
FIG. 17 is a flowchart illustrating a subprocess for filling the gravitationally-highest primary vessel with the quantity of source water while using the multi-stage embodiment.

As can be seen in FIGS. 2, 3, and 17, this more intricate setup for the system of the present invention is also provided with a gravitationally-highest primary vessel (i.e., furthest from the ground) from the plurality of primary vessels, and the gravitationally-highest primary vessel is provided with a feed valved inlet 13 because a quantity of source water needs to initially enter somewhere into this more intricate setup for the system of the present invention. As similarly described above, the feed valved inlet 13 is positioned proximal to the gravitationally-higher side 11 of the gravitationally-highest primary vessel and is positioned distal to the gravitationally-lower side 12 of the gravitationally-highest primary vessel, which allows a fluid to pour into the gravitationally-highest primary vessel from its top. Thus, the quantity of source water is received through the feed valved inlet 13 and into the gravitationally-highest primary vessel before Step C of a first iteration, wherein the first iteration is from the plurality of iterations for Steps C through I. As similarly described above, the quantity of source water for the first iteration is preferably retrieved from a natural source of untreated water (e.g., a source of seawater or freshwater) and is then preferably retained within a feed tank until the feed valved inlet 13 is opened to fill the gravitationally-highest primary vessel 1 with the quantity of source water. Furthermore, after the gravitationally-highest primary vessel is filled with the initial quantity of source water at NTP, a weak vacuum may be applied within the gravitationally-highest primary vessel during the first iteration in order to remove an excessive amount of air within the gravitationally-highest primary vessel, which reduces the amount of air that needs to be eventually removed during Steps C and E of the first iteration.

As can be seen in FIG. 1, a quantity of packing media 4 may be retained within the primary vessel 1 because the quantity of packing media 4 can improve the present invention with its different functionalities. One functionality of the quantity of packing media 4 is that the quantity of packing media 4 can mitigate liquid turbulence during filling/draining/mixing of a fluid within the primary vessel 1. Another functionality of the quantity of packing media 4 is that the quantity of packing media 4 can be used as nucleation sites to propagate ice crystallization during Step E. Another functionality of the quantity of packing media 4 is that the quantity of packing media 4 can act as a filter to retain a plurality of ice crystals that may have been dislodged from the second water portion. In addition, the quantity of packing media 4 is preferably a plurality of spherical balls, and, more specifically, the plurality of spherical balls is made of ceramic.

As can be seen in FIG. 1, at least one internal modification to the primary vessel 1 may be configured to promote ice-crystal growth at specific nucleation sites during Step E. Nucleation sites can be promoted within the primary vessel 1 through a variety of different internal modifications. One kind of internal modification to the primary vessel 1 is to retain a quantity of packing media 4 within the primary vessel 1 so that the quantity of packing media 4 can act as nucleation sites for ice-crystal growth. The quantity of packing media 4 can be, but is not limited to, dust, sand, and ice crystals. Another kind of internal modification to the primary vessel 1 is to add a lining/coating to an inner surface of the primary vessel 1 so that the inner surface of primary vessel 1 can act as nucleation sites for ice-crystal growth.

Figure 18:
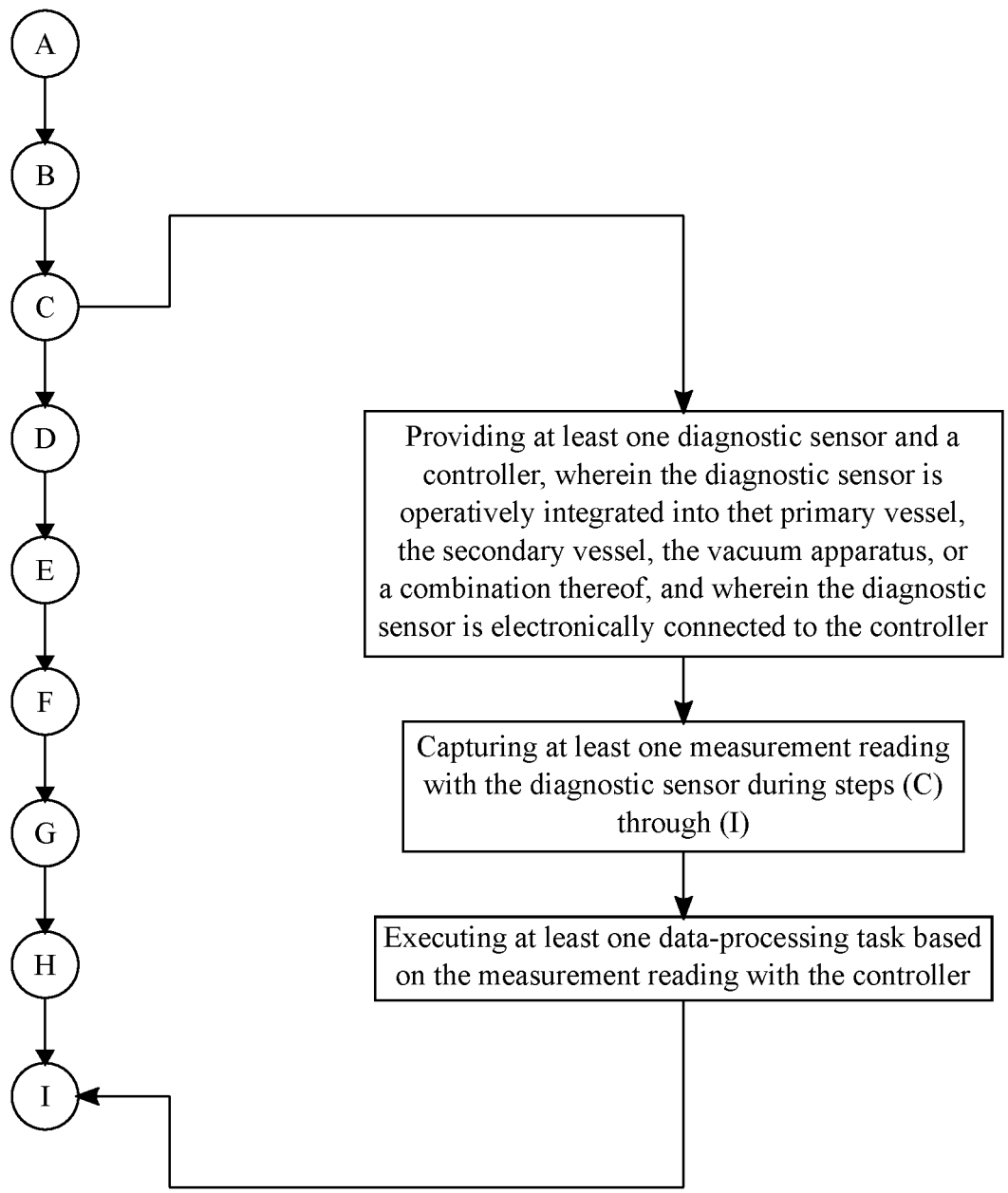
FIG. 18 is a flowchart illustrating a subprocess for processing diagnostic data for the system of the present invention.

As can be seen in FIGS. 1 and 18, the system of the present invention may use at least one diagnostic sensor 5 and a controller 6 in order to track whether or not its internal components are properly and/or optimally functioning. The diagnostic sensor 5 is used to take a quantitative reading on some internal physical condition of the system of the present invention, which allows at least one measurement reading to be captured with the diagnostic sensor 5 during Steps C through I. The measurement reading can be, but is not limited to, a pressure reading, a temperature reading, a flowrate reading, an ice-detection reading, a water-quality reading, or a combination thereof. The controller 6 is used to manage and process data for the system of the present invention and is used to manage and process commands to and from the other electronic components for the system of the present invention. Thus, the controller 6 is able to execute at least one data-processing task based on the measurement reading. The data-processing task can be, but is not limited to, logging and storing data, outputting a warning based on a short-term data trend, outputting a warning based on a long-term data trend, relaying data to a display to be viewed by a user, or a combination thereof.

Figure 19:
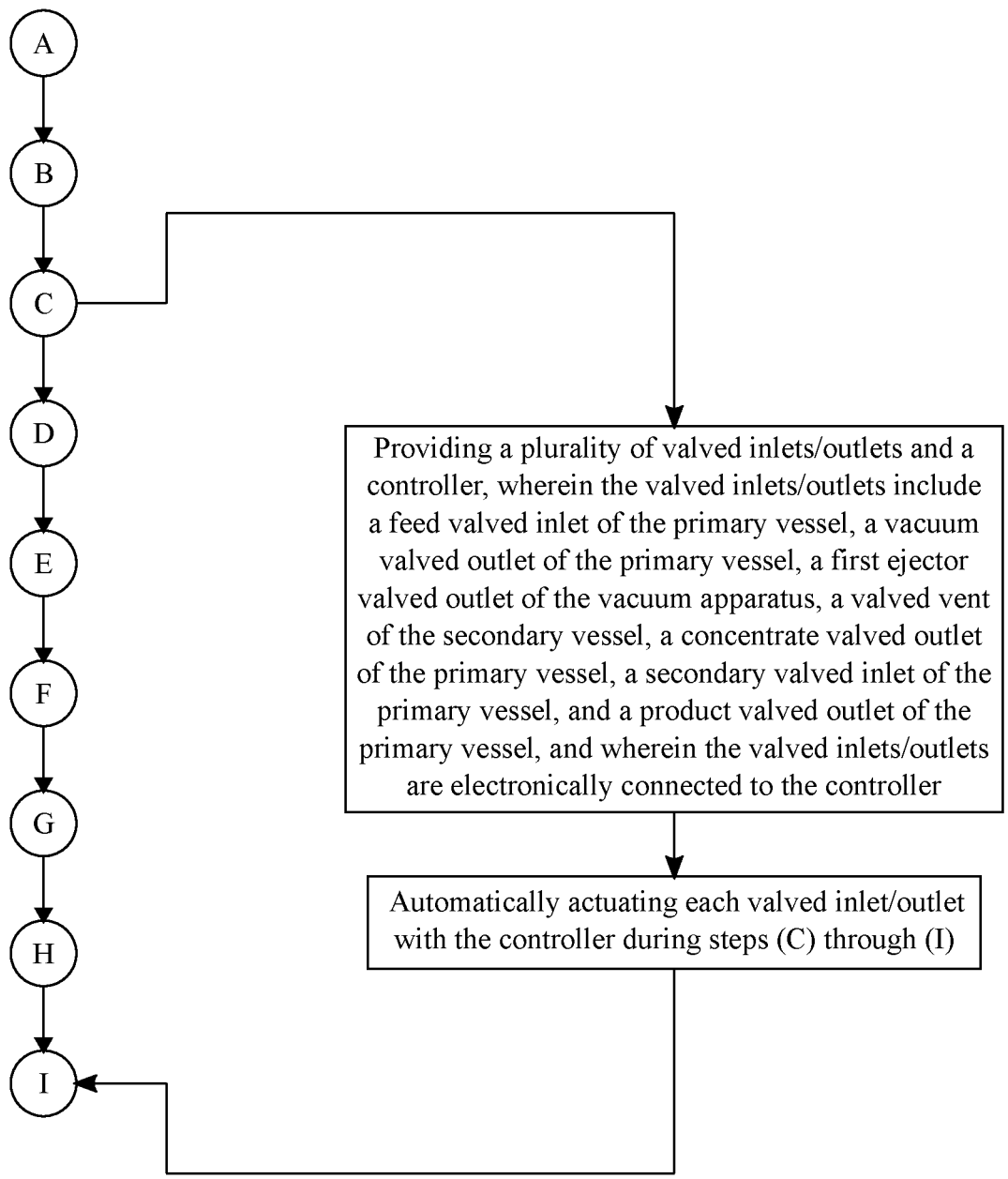
FIG. 19 is a flowchart illustrating a subprocess for automatically actuating the valved inputs/outputs for the system of the present invention.
Figure 20:
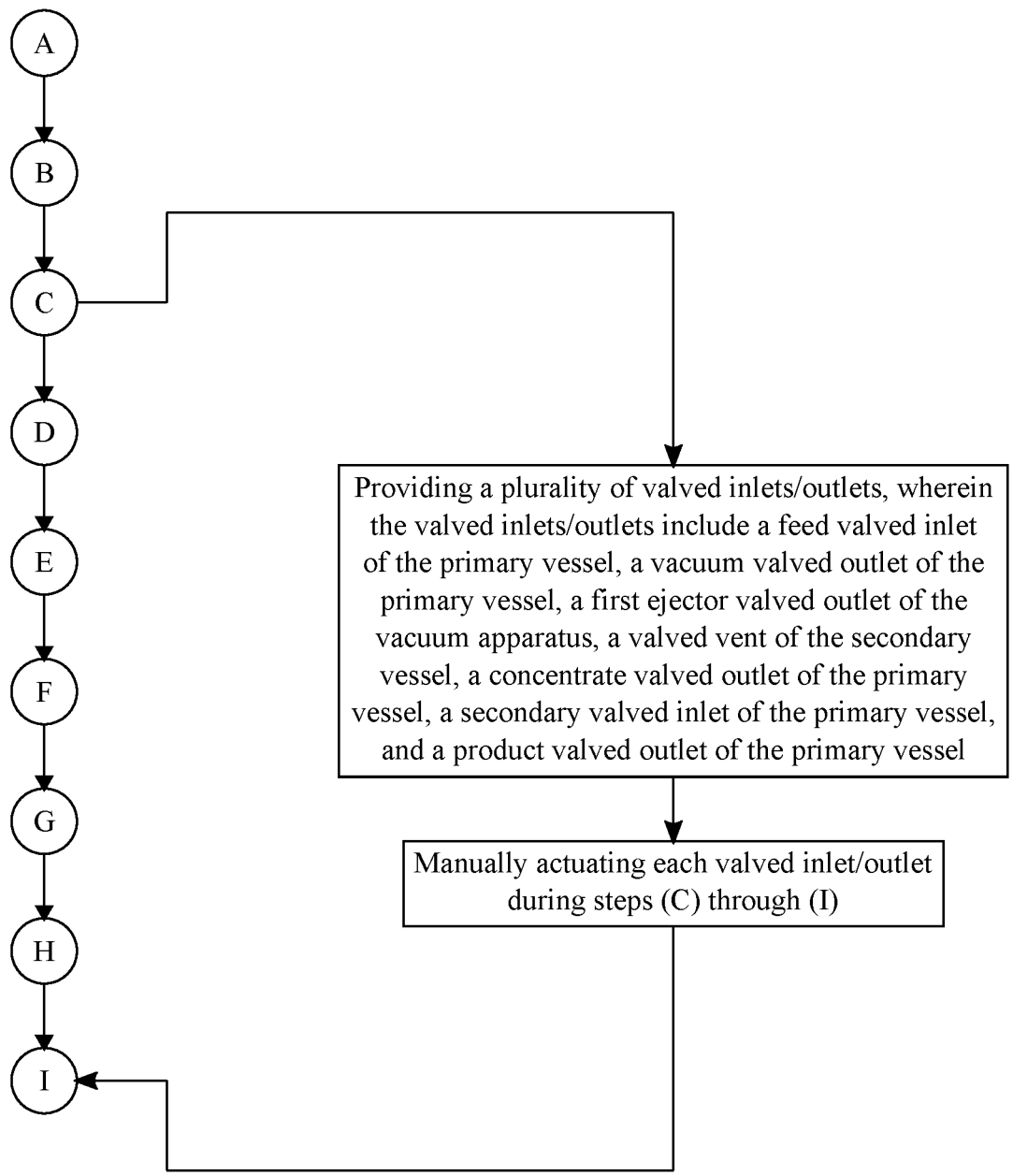
FIG. 20 is a flowchart illustrating a subprocess for manually actuating the valved inputs/outputs for the system of the present invention.

The system of the present invention may also use a plurality of valved inlets/outlets to control fluid-flow amongst the primary vessel 1, the vacuum apparatus 2, the secondary vessel 3, and any other functional component for the system of the present invention. The valved inlets/outlets include, but are not limited to, a feed valved inlet 13 of the primary vessel 1, a vacuum valved outlet 14 of the primary vessel 1, a first ejector valved outlet 23 of the vacuum apparatus 2, a valved vent 32 of the secondary vessel 3, a concentrate valved outlet 15 of the primary vessel 1, a secondary valved inlet 17 of the primary vessel 1, and a product valved outlet 18 of the primary vessel 1. Moreover, as can be seen in FIGS. 1 and 19, if each valved inlet/outlet is electronically connected to a controller 6, then the controller 6 would automatically actuate each valved inlet/outlet at the necessary time during Steps C through I, which would provide a precise and accurate way of controlling the fluid-flow through the system of the present invention. Alternatively, as can be seen in FIGS. 1 and 20, each valved inlet/outlet could be manually actuated by a user at the necessary time during Steps C through I, which would allow the user to conscientiously and carefully control the fluid-flow through the system of the present invention.

Although the invention has been explained in relation to its preferred embodiment, it is to be understood that many other possible modifications and variations can be made without departing from the spirit and scope of the invention as hereinafter claimed.

What is claimed is:

1. A method of distilling/desalinating water in a vacuum-applied multi-phase manner, the method comprising the steps of:
   (A) providing at least one primary vessel, at least one vacuum apparatus, and at least one secondary vessel, wherein the primary vessel and the secondary vessel are in fluid communication with the vacuum apparatus, and wherein the primary vessel and the secondary vessel are in fluid communication with each other;
   (B) providing a quantity of source water retained by the primary vessel;
   (C) evaporating a first water portion off the quantity of source water and transferring the first water portion from the primary vessel, through the vacuum apparatus, and into the secondary vessel by generating a vacuum pressure inside the primary vessel with the vacuum apparatus;
   (D) condensing and retaining the first water portion inside the secondary vessel as an ambient pressure is maintained inside the secondary vessel;
   (E) freezing a second water portion from the quantity of source water within the primary vessel by generating the vacuum pressure inside the primary vessel with the vacuum apparatus;
   (F) draining a liquid remaining portion of the quantity of source water out of the primary vessel, wherein the liquid remaining portion is located underneath the second water portion;
   (G) transferring the first water portion from the secondary vessel, into the primary vessel, and onto the second water portion;
   (H) melting the second water portion with the first water portion inside the primary vessel in order to form a quantity of purified water; and
   (I) draining the quantity of purified water out of the primary vessel.

2. The method as claimed in claim 1, wherein the primary vessel and the secondary vessel are thermally-insulated vessels.

3. The method as claimed in claim 2, wherein the thermally-insulated vessels are double-walled vessels, and wherein a vacuum is retained within the double-walled vessels.

4. The method as claimed in claim 1 comprising the steps of:
   providing the primary vessel with a gravitationally-higher side and a gravitationally-lower side, wherein the gravitationally-higher side and the gravitationally-lower side are positioned opposite to each other about the primary vessel, and wherein a feed valved inlet of the primary vessel is positioned proximal to the gravitationally-higher side and is positioned distal to the gravitationally-lower side; and
   receiving the quantity of source water through the feed valved inlet and into the primary vessel before step (B).

5. The method as claimed in claim 1 comprising the steps of:
   providing the primary vessel with a gravitationally-higher side and a gravitationally-lower side, wherein the gravitationally-higher side and the gravitationally-lower side are positioned opposite to each other about the primary vessel, and wherein a vacuum valved outlet of the primary vessel is in fluid communication with a vacuum inlet of the secondary vessel through the vacuum apparatus, and wherein the vacuum valved outlet is positioned proximal to the gravitationally-higher side and is positioned distal to the gravitationally-lower side; and
   transferring the first water portion from the primary vessel, through the vacuum valved outlet, through the vacuum apparatus, through the vacuum inlet, and into the secondary vessel during step (C).

6. The method as claimed in claim 1 comprising the steps of:
   providing the vacuum apparatus as a gas ejector, wherein the primary vessel is in fluid communication with a first ejector inlet of the gas ejector, and wherein a motive steam is fed into a second ejector inlet of the gas ejector, and wherein a first ejector valved outlet of the gas ejector is selectively opened to the atmosphere, and wherein a second ejector outlet of the gas ejector is in fluid communication with the secondary vessel; and
   driving the motive steam through the gas ejector in order to generate the vacuum pressure inside the primary vessel during steps (C) and (E).

7. The method as claimed in claim 1 comprising the steps of:
   providing the secondary vessel with a valved vent; and
   maintaining the ambient pressure inside the secondary vessel by selectively opening the valved vent to the atmosphere during step (D).

8. The method as claimed in claim 1 comprising the steps of:
   providing the primary vessel with a gravitationally-higher side and a gravitationally-lower side, wherein the gravitationally-higher side and the gravitationally-lower side are positioned opposite to each other about the primary vessel, and wherein a concentrate valved outlet of the primary vessel is positioned proximal to the gravitationally-lower side and is positioned distal to the gravitationally-higher side; and
   draining the liquid remaining portion out of the primary vessel and through the concentrate valved outlet during step (F).

9. The method as claimed in claim 8 comprising the steps of:
   providing the primary vessel with a screen, and wherein the screen is positioned proximal to the gravitationally-lower side and is positioned distal to the gravitationally-higher side, and wherein the screen is in fluid communication with the concentrate valved outlet;
   providing a plurality of ice crystals dislodged from the second water portion into the liquid remaining portion; and
   filtering the ice crystals out of the liquid remaining portion with the screen as the liquid remaining portion is drained out of the primary vessel and through the concentrate valved outlet.

10. The method as claimed in claim 1 comprising the steps of:
    providing the primary vessel with a gravitationally-higher side and a gravitationally-lower side, wherein the gravitationally-higher side and the gravitationally-lower side are positioned opposite to each other about the primary vessel, and wherein a primary outlet of the secondary vessel is in fluid communication with a secondary valved inlet of the primary vessel, and wherein the secondary valved inlet is positioned proximal to the gravitationally-higher side and is positioned distal to the gravitationally-lower side; and
    transferring the first water portion from the secondary vessel, through the primary outlet, through the secondary valved inlet, into the primary vessel, and onto the second water portion during step (G).

11. The method as claimed in claim 1 comprising the steps of:
    providing the primary vessel with a gravitationally-higher side and a gravitationally-lower side, wherein the gravitationally-higher side and the gravitationally-lower side are positioned opposite to each other about the primary vessel, and wherein a product valved outlet of the primary vessel is positioned proximal to the gravitationally-lower side and is positioned distal to the gravitationally-higher side; and
    draining the quantity of purified water out of the primary vessel and through the product valved outlet during step (I).

12. The method as claimed in claim 11 comprising the steps of:
    providing the primary vessel with a screen, and wherein the screen is positioned proximal to the gravitationally-lower side and is positioned distal to the gravitationally-higher side, and wherein the screen is in fluid communication with the product valved outlet;
    providing a plurality of ice crystals filtered onto the screen; and
    melting the ice crystals off of the screen and into the quantity of purified water as the quantity of purified water is drained out of the primary vessel and through the product valved outlet.

13. The method as claimed in claim 1 comprising the steps of:
    providing the at least one primary vessel as a plurality of primary vessels, wherein each primary vessel comprises a vessel body, a gravitationally-higher side, a gravitationally-lower side, and a product valved outlet, and wherein the gravitationally-higher side and the gravitationally-lower side are positioned opposite to each other about the vessel body, and wherein the product valved outlet is positioned proximal to the gravitationally-lower side and is positioned distal to the gravitationally-higher side, and wherein each adjacent pair from the plurality of primary vessels comprises a gravitationally-higher primary vessel and a gravitationally-lower primary vessel, and wherein the product valved outlet of the gravitationally-higher primary vessel is in fluid communication with the gravitationally-higher side of the gravitationally-lower primary vessel;
    executing a plurality of iterations for steps (C) through (I), wherein each iteration for steps (C) through (I) uses a different primary vessel from the plurality of primary vessels;
    draining the quantity of purified water out of the gravitationally-higher primary vessel and through the product valved outlet of the gravitationally-higher primary vessel during step (I) of an arbitrary iteration, wherein the arbitrary iteration is any iteration from the plurality of iterations for steps (C) through (I); and
    receiving the quantity of purified water for the arbitrary iteration as the quantity of source water for a subsequent iteration into the gravitationally-lower primary vessel before step (C) of the subsequent iteration, wherein the arbitrary iteration and the subsequent iteration are two consecutive iterations from the plurality of iterations for steps (C) through (I).

14. The method as claimed in claim 13 comprising the steps of:
    providing a gravitationally-highest primary vessel from the plurality of primary vessels with a feed valved inlet, wherein the feed valved inlet is positioned proximal to the gravitationally-higher side of the gravitationally-highest primary vessel and is positioned distal to the gravitationally-lower side of the gravitationally-highest primary vessel; and
    receiving the quantity of source water through the feed valved inlet and into the gravitationally-highest primary vessel before step (C) of a first iteration, wherein the first iteration is from the plurality of iterations for steps (C) through (I).

15. The method as claimed in claim 1, wherein a quantity of packing media is retained within the primary vessel.

16. The method as claimed in claim 15, wherein the quantity of packing media is a plurality of spherical balls, and wherein the plurality of spherical balls is made of ceramic.

17. The method as claimed in claim 1, wherein at least one internal modification to the primary vessel is configured to promote ice-crystal growth at specific nucleation sites during step (E).

18. The method as claimed in claim 1 comprising the steps of:
- providing at least one diagnostic sensor and a controller, wherein the diagnostic sensor is operatively integrated into the primary vessel, the secondary vessel, the vacuum apparatus, or a combination thereof, and wherein the diagnostic sensor is electronically connected to the controller;
- capturing at least one measurement reading with the diagnostic sensor during steps (C) through (I); and
- executing at least one data-processing task based on the measurement reading with the controller.

19. The method as claimed in claim 1 comprising the steps of:
- providing a plurality of valved inlets/outlets and a controller, wherein the valved inlets/outlets include a feed valved inlet of the primary vessel, a vacuum valved outlet of the primary vessel, a first ejector valved outlet of the vacuum apparatus, a valved vent of the secondary vessel, a concentrate valved outlet of the primary vessel, a secondary valved inlet of the primary vessel, and a product valved outlet of the primary vessel, and wherein the valved inlets/outlets are electronically connected to the controller; and
- automatically actuating each valved inlet/outlet with the controller during steps (C) through (I).

20. The method as claimed in claim 1 comprising the steps of:
- providing a plurality of valved inlets/outlets, wherein the valved inlets/outlets include a feed valved inlet of the primary vessel, a vacuum valved outlet of the primary vessel, a first ejector valved outlet of the vacuum apparatus, a valved vent of the secondary vessel, a concentrate valved outlet of the primary vessel, a secondary valved inlet of the primary vessel, and a product valved outlet of the primary vessel; and
- manually actuating each valved inlet/outlet during steps (C) through (I).

* * * * *